US008131839B2

(12) United States Patent
Yu et al.

(10) Patent No.: US 8,131,839 B2
(45) Date of Patent: Mar. 6, 2012

(54) METHOD AND APPARATUS FOR RESOURCE ASSIGNMENT IN A SENSOR NETWORK

(75) Inventors: Yang Yu, Rolling Meadows, IL (US); Loren J. Rittle, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1252 days.

(21) Appl. No.: 11/832,259

(22) Filed: Aug. 1, 2007

(65) Prior Publication Data

US 2009/0037570 A1 Feb. 5, 2009

(51) Int. Cl.
*G06F 15/173* (2006.01)
*G06F 15/16* (2006.01)
*H04W 4/00* (2009.01)
*H04L 12/26* (2006.01)

(52) U.S. Cl. ........ 709/224; 370/338; 370/252; 709/200; 709/226; 709/249

(58) Field of Classification Search .................. 370/338, 370/252; 709/249, 200, 226, 224
See application file for complete search history.

(56) References Cited

U.S. PATENT DOCUMENTS

| | | | |
|---|---|---|---|
| 5,745,483 A | 4/1998 | Nakagawa et al. | |
| 5,802,367 A | 9/1998 | Held et al. | |
| 6,360,264 B1 | 3/2002 | Rom | |
| 6,421,731 B1 | 7/2002 | Ciotti et al. | |
| 6,813,631 B2 | 11/2004 | Pouchak et al. | |
| 6,817,016 B1 | 11/2004 | Wegman et al. | |
| 6,973,309 B1 | 12/2005 | Rygula et al. | |
| 6,990,316 B2 | 1/2006 | Heinonen et al. | |
| 7,012,394 B2 | 3/2006 | Moore et al. | |
| 7,020,701 B1 | 3/2006 | Gelvin et al. | |
| 7,035,240 B1 * | 4/2006 | Balakrishnan et al. ....... | 370/338 |
| 7,277,414 B2 * | 10/2007 | Younis et al. ................. | 370/338 |
| 7,408,911 B2 | 8/2008 | Joshi | |
| 7,797,367 B1 * | 9/2010 | Gelvin et al. ................. | 709/200 |
| 8,031,684 B2 * | 10/2011 | Roadknight .................. | 370/338 |
| 2002/0151297 A1 | 10/2002 | Remboski et al. | |
| 2003/0005167 A1 | 1/2003 | Khare et al. | |
| 2003/0065743 A1 | 4/2003 | Jenny et al. | |
| 2004/0064351 A1 | 4/2004 | Mikurak | |
| 2004/0098447 A1 | 5/2004 | Verbeke et al. | |

(Continued)

OTHER PUBLICATIONS

A. Howard, M.J. Mataricie and G.S. Sukhatma, "Mobile sensor network deployment using potential fields: A distributed, scalable solution to the area coverage problem", International Symposium on Distributed Autonomous Robotics Systems, Jun. 2002.

(Continued)

*Primary Examiner* — Joseph Avellino
*Assistant Examiner* — Aftab Nasir Khan (57) ABSTRACT

Resources are assigned in a network of sensor nodes by a first sensor node of the network detecting an event and collecting data samples for the event, exchanging messages with other sensor nodes of the network that detect the event to form a community of sensor nodes. Based on information exchanged, the total data samples collected for the event is calculated and the community sends a help message to other sensor nodes. The other sensor nodes are assigned to cover the event if the potential marginal gain if they were to cover the event exceeds a threshold. The potential marginal gain comprises the expected change in a utility function that is dependent upon the total data samples collected for the event by the community. The utility function is a concave function of the total data samples and may be dependent upon an importance level of the event.

18 Claims, 5 Drawing Sheets

U.S. PATENT DOCUMENTS

| | | | |
|---|---|---|---|
| 2004/0133640 | A1 | 7/2004 | Yeager et al. |
| 2004/0136358 | A1 | 7/2004 | Hind et al. |
| 2004/0162871 | A1 | 8/2004 | Pabla et al. |
| 2004/0215791 | A1 | 10/2004 | Tsao |
| 2004/0268322 | A1 | 12/2004 | Chow et al. |
| 2005/0120346 | A1 | 6/2005 | Sprigg |
| 2005/0141465 | A1* | 6/2005 | Kato et al. ............... 370/337 |
| 2005/0160195 | A1 | 7/2005 | Bruner et al. |
| 2005/0289266 | A1 | 12/2005 | Illowsky et al. |
| 2006/0049271 | A1 | 3/2006 | Hitt |
| 2006/0103534 | A1 | 5/2006 | Arms et al. |
| 2006/0126524 | A1 | 6/2006 | Tateson |
| 2006/0178156 | A1 | 8/2006 | Kim |
| 2006/0215588 | A1 | 9/2006 | Yoon |
| 2006/0253570 | A1 | 11/2006 | Biswas et al. |
| 2006/0262721 | A1* | 11/2006 | Radunovic et al. ........... 370/229 |
| 2006/0271661 | A1* | 11/2006 | Qi et al. ................. 709/223 |
| 2008/0070614 | A1* | 3/2008 | Ogushi et al. ............. 455/522 |
| 2008/0109536 | A1* | 5/2008 | Hong et al. ............... 709/220 |

OTHER PUBLICATIONS

B. Lui, P. Brass, and O. Dousse, "Mobility improves coverage of sensor networks", ACM MobiHoc, May 2005.

N. Bisnik, A. Abouzeid, and V. Isler, "Stochastic event capture using mobile sensors subject to a quality metric", ACM/IEEE MobiCom, Sep. 2006.

Y. Zou and K. Charabarty, "Sensor deployment and target localization based on virtual forces", IEEE InfoCom, Apr. 2003.

S. Meguerdichian, F. Koushanfara, M. Potkonjak, and M.B. Srivastava, "Coverage problems in wireless ad-hoc sensor networks", IEEE InfoCom, Mar. 2001, pp. 1380-1387.

D. Tian and N.D. Georganas, "A coverage-preserving node scheduling scheme for large wireless sensor networks", ACM WSNA, Sep. 2002.

C-F Huang and Y-C Tseng, "The coverage problem in a wireless sensor network", SCM WSNA, Sep. 2003.

S. Shakkotai, R. Srikant and N. Shroff, "Unreliable sensor grids: Coverage, connectivity and diameter", IEEE InfoCom, Mar. 2003.

X. Wang, G. Xing, Y. Zhang, C. Lu, R. Pless, and C. Grill, "Integrated coverage and connectivity configuration wireless sensor networks", ACM SenSys, Nov. 2003, pp. 28-39.

S. Kumar, T.H. Lai and J. Balogh, "On k-coverage in a mostly sleeping sensor network", ACM MobiHoc, Jun. 2004, pp. 144-158.

G. Wang, G. Cao, and T.L. Porta, "Movement-assisted sensor deployment", IEEE InfoCom, Mar. 2004.

www.swarm-bot.org, Oct. 1, 2001.

B. Gerkey and M. Mataric, "A formal analysis and taxonomy of task allocation in multi-robot systems", Intl. J. of Robotics Research 23(9), Sep. 2004, pp. 939-954.

P. Levis and D. Culler, Mate: a tiny machine for sensor networks, International Conference on Architectural Support for Programming Languages and Operating Systems, San Jose, CA, Oct. 2002, 11 pgs.

H. Chan and A. Perrig, ACE: an emergent algorithm for highly uniform cluster formation, Proceedings of the First European Workshop on Sensor Networks (EWSN), Jan. 2004, 16 pgs.

C. Frank and K. Romer, Algorithms for generic role assignment in wireless sensor networks, Proceedings of the 3rd ACM Conference on Embedded Networked Sensor Systems (SenSys), Nov. 2005, 13 pgs.

Liu et al., State-centric programming for sensor-actuator network systems, IEEE Pervasive Computing, Oct.-Dec. 2003, pp. 50-62.

Steffan, J. et al., Towards multi-purpose wireless sensor networks, ICW, 2005 Sytems Communications (ICW'05, ICHSN'05, ICMCS'05, SENET'05) 2005, pp. 336-341.

Yu, Y. et al., Melete: concurrent applications in wireless sensor networks, ACM SenSys 2006, 14 pgs.

Johannes Helmig, "Windows 98 Update," Windows Networking, http//windowsnetworking.com/articles_tutorials/w98updat.html, Published Dec. 2, 2000.

Microsoft, "Getting the Most from Windows Update," Microsoft Corporation, May 7, 2002, http://technet.microsoft.com/en-us/library/cc722656.aspx.

Hsieh et al., "Efficient Localization in Mobile Wireless Sensor Networks," IEEE International Conference on Sensor Networks, Ubiquitous and Trustworthy Computing 2006, vol. 1, Jun. 7-5, 2006, pp. 292-297.

Chung et al., "Ubiquitous Zone (U-Zone) based Community Networking Technologies," 3rd Annual IEEE Communications Society on Sensor and Ad Hoc Communications and Networks, SECON '06, vol. 2, Sep. 28, 2006, pp. 678-683.

Young Sang Jun, "PCT Search Report and Written Opinion," WIPO, ISA/KR, Korean Intellectual Property Office, Daejeon, Republic of Korea, Dec. 24, 2008.

Han et al, "Senor Network Software Update Management: A Survey," International Journal of Network Management, 2005, 15: pp: 283-294.

* cited by examiner

FIG. 8

METHOD AND APPARATUS FOR RESOURCE ASSIGNMENT IN A SENSOR NETWORK

BACKGROUND

This invention relates generally to the field of sensor networks. More particularly, this invention relates to the improvement of event sampling quality in mobile sensor networks.

Many real-life applications for sensor networks require sampling target events with sufficient resolution over both spatial and temporal dimensions. When the deployed nodes are not sufficient to fully cover the sensor field to satisfy the spatiotemporal sampling requirements of all events, nodes with intelligent mobility can be deployed to schedule the system resources efficiently for better sampling quality.

It is known that sensor mobility can be used to improve the network coverage over time and that motion planning can be used to achieve bounded sampling quality in terms of event loss probability, when location and temporal statistics of events are known a priori. However, previous approaches assume a simple event capture model, namely, that the event is binary and one sensor node is sufficient to capture the event. This model fails for many real-world scenarios, where to fully capture the spatiotemporal dynamics of events require sampling resolution along both space and time domains. In other words, a set of sensor nodes needs to cover the entire event for a sufficient period of time.

In many scenarios, such as urban rescue or battlefield surveillance, a pre-deployed static sensor network is either costly or difficult. Mobile nodes provide a much more flexible and practical deployment approach. Also, some applications (e.g., non-intrusive habitat study) prohibit the deployment of high density networks, but are well-suited to the use mobile nodes.

Robot Swarming is a related technique that is used for a large population of relatively simple agents to collectively behave based on certain rules. However, swarming robots focus on collective behavior such as dispersing into a room, following each other, and self-assembling. They are less concerned about resource scheduling into multiple tasks with differentiated benefit-cost ratios.

Another related problem is that of multi-robot task allocation (MRTA). However, MRTA focuses on the assignment of a set of tasks to a set of heterogeneous robots (in terms of their utility of accomplish a given task) so that the overall utility of performing all tasks is optimized. Existing algorithms for MRTA are either centralized or require full cooperation among robots, and are not suitable for a large population of sensor nodes.

The virtual force concept has been used for uniformly dispersing mobile nodes into a room. In the virtual force schemes, nodes are repelled from one another by a virtual force. Specific techniques are used for virtual force generation and propagation, and for node response to the virtual force.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Before describing in detail embodiments that are in accordance with the present invention, it should be observed that the embodiments reside primarily in combinations of method steps and apparatus components related to resource assignment in a sensor network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by the phrase "comprises . . . a" does not, without more constraints, preclude the existence of additional identical elements in the process, method, article, or apparatus that comprises the element.

It will be appreciated that embodiments of the invention described herein may comprise one or more conventional processors and unique stored program instructions that control the one or more processors to implement, in conjunction with certain non-processor circuits, some, most, or all of the functions of resource assignment in a sensor network described herein. The non-processor circuits may include, but are not limited to, a radio receiver, a radio transmitter, signal drivers, clock circuits, power source circuits, and sensors. As such, these functions may be interpreted as a method to perform resource assignment in a sensor network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

One embodiment of the present invention relates to a method and apparatus for improving event sampling quality in sensor networks, subject to various resource constraints. An aim is to schedule limited system resources in the network so that the overall sampling quality of multiple events is maximized. These multiple events may occur either together or separately over time, and they may overlap with each other. The amount of resource to be allocated for each event is determined by exploring the tradeoffs of benefit-cost ratios between various events. In one embodiment, a parameterized sampling utility function is used to determine the sampling quality of an event. Sensor node deployment and mobility is controlled dependent upon the sampling utility function to improve sampling quality.

The mobility of a sensor node enables the coverage of a large sensing field over time, with a relatively small number of nodes. This ameliorates both system cost and scalability issues. Node mobility also enables on-demand field exploration, which is suitable for information search in unknown fields, such as on-demand urban rescue. An intelligent mobility scheme should be able to gather nodes around events of interest for efficient use of scarce sensing and processing resources. When the events diminish, the scheme should be able to disperse the nodes for better coverage of the entire field.

Previous sampling models are designed for binary and geographically limited events. For a binary model: an event is caught once it is detected by some sensors at any time instant. While sufficient for binary events, this model is unsuitable to continuously capture the temporal dynamics of the event over time. For example, to monitor water pollution in a water body, it is crucial to sample the temporal variations in the concentration of various toxic substances, which necessitates continuous sampling for days or weeks. Also, previous efforts assume that one sensor is sufficient to sense a single event. While this suffices for simple events with limited spatial extent, it fails to sample geographically spanning events with large spatial dynamics. For the example of water pollution monitoring, it is often important to gather information of the contaminants within a large water body around the polluting source, requiring a large amount of sensors.

In many realistic applications, such as with the National Incident Management System (NIMS), full capture of the spatiotemporal dynamics of an event requires sampling at certain resolution and longitude over both space and time domains. Existing binary, single-node sampling models are not suitable for such applications. In the ideal case, a sufficient number of nodes is required to fully cover the event area for its entire time duration.

When this requirement cannot be satisfied, because there are too few nodes or the nodes lack mobility, resource assignment based on the sampling utility function of the present invention may be used to maximize the sampling quality of the event.

The following three diverse examples illustrate the applicability of the invention:

The first example relates to a set of mobile sensor nodes that are deployed in a large sensor field to monitor events. To fully capture the spatiotemporal dynamics of an event requires a set of sensor nodes to fully cover the event area and perform continuous sampling over the lifetime of the event. In cases where insufficient sensor nodes are available to fully capture all events, it is desirable to schedule the mobility of the nodes so that the overall system sampling quality is maximized, even though some events may not be fully captured. In this example, the system resource is the limited number of sensor nodes.

The second example relates to a set of static nodes that perform sleep scheduling for energy efficient event sampling. Given the total amount of energy of the system as a fixed resource budget, it is desirable to allocate energy (in terms of awaken nodes) to various events. The energy for a particular event should not be overused, for example by waking up too many nodes, since this would lead to reduced system lifetime and event missing in the future. Instead, nodes are awakened using statistic knowledge of events such that the expected overall sampling quality is maximized, although the sampling quality of certain events may be compromised.

The third example relates to a sensor network with on-demand code downloading and installation. If the total energy budget of code transmission is limited, the number of copies that can be downloaded for sensing a particular event is limited. This example resembles the aforementioned case of waking up sensor nodes. In this example, code transmission (and its related execution) is scheduled to maximize the system lifetime and the overall sensing quality of the network.

The first example is a low density network configuration (nodes physically move to gain coverage). The second example is a high density network configuration (the active nodes logically move to gain coverage). The third example is also a high density network configuration (code to support the active nodes logically moves to gain coverage). The method of the present invention may be used to move or assign resources to gain event detection and characterization coverage.

An embodiment of the invention is described below with reference to the scheduling problem in the first example. However, the concept of a sampling utility function (to be detailed later) and the associated resource scheduling methods are readily applicable or easily adaptable to solve the problems in the second and third examples, and in other resource allocation problems.

In accordance with some embodiments of the present invention, resources are assigned in a network of sensor nodes by a first node of the network detecting an event and collecting data samples for the event, the first node exchanging messages with other nodes of the network that detect the event to form a community of nodes and nodes in the community exchanging sensor data and location information. Based on the exchanged information, one or more nodes of the community compute the total data samples collected for the event by the community and the first node of the community sends a help message to one or more second nodes outside of the community. The second node estimates a potential marginal gain to be attained if it were to be assigned to cover the event and the second node is assigned to cover the event if the potential marginal gain exceeds a threshold. The potential marginal gain comprises the expected change in a utility function that is dependent upon the total data samples collected for the event by the community. The utility function is a concave function of the total data samples collected for the event by the community and may be dependent upon an importance level of the event.

The total data samples collected by the community may be calculated as a time integral of the event coverage provided by the community.

The help message may include the data samples collected by the community before the help message was sent, and the location of the event. Alternatively, a measure of the data samples may be sent rather than the data samples themselves. The measure may be a summary of the data samples or information derived from the data samples. It may further include the importance level of the event, the time the message was sent or generated, the time the event was first detected, the estimated area of the event, the area covered by a node in the community, and the concave function to be used to calculate the utility function.

The potential marginal gain may be calculated dependent upon the estimated time from when the help message was received to when the second node will detect the event. In some embodiments, the time from when the help message was received at the second node may be grossly different than the time when the help message was sent or generated. This may happen when the second node employs a sleep duty cycle or whenever the message is delivered over a multi-hop route wherein some router nodes employ a sleep duty cycle. In this case, the potential marginal gain may be calculated dependent upon the estimated time from when the help message was sent or generated to when the second node will detect the event.

When the second node is a mobile node, it may seek to cover the event by moving towards the event. Alternatively, the second node may cover the event by activating previously deactivated functions. Still further, the second mode may cover the event by receiving code from a remote source and then executing that code.

When the nodes are mobile nodes, the nodes in the community may move away from each other within the area of the event so as to disperse themselves over the area of the event.

The second node joins the community once it detects the event.

In accordance with some embodiments of the inventions, a network of sensor nodes for collecting data samples of an event includes a first set of sensor nodes operable to detect the event, collect data samples for the event, and exchange messages to form a community of sensor nodes when the event is detected. A second set of one or more sensor nodes, contained within the first set of sensor nodes, is operable to compute the total data samples collected for the event by the community. An external sensor node, not within the community of sensor nodes, is operable to receive a help message from a sensor node of the community and is further operable to cover the event if an estimate of a potential marginal gain exceeds a threshold, the potential marginal gain comprising the expected change in a utility function that is dependent upon the total data samples collected for the event by the community.

Figure 1:
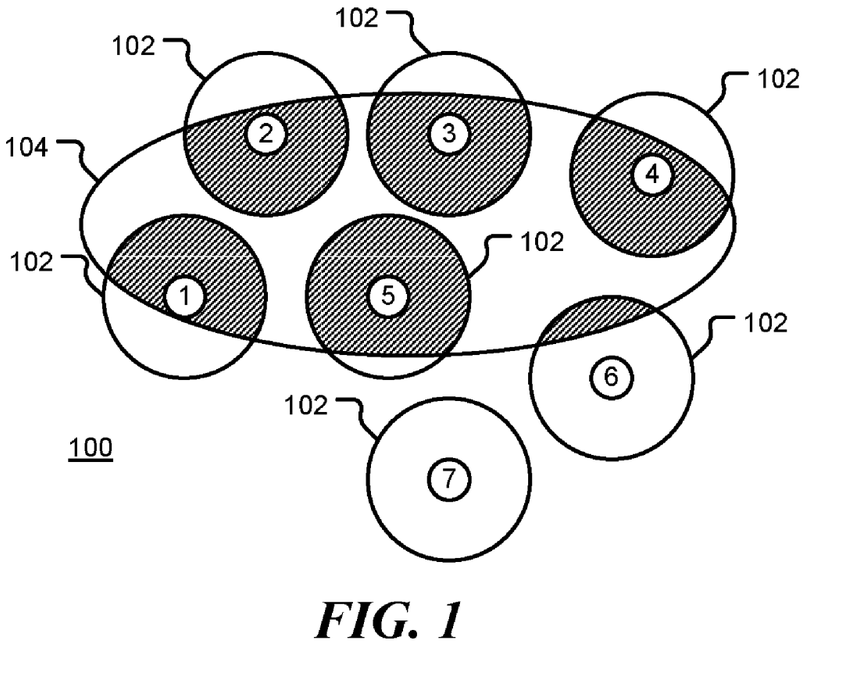
FIG. 1 is a diagram of an exemplary sensor field, showing a sensor network and an event area.

FIG. 1 is a diagram of an exemplary sensor field 100 in which a set of sensor nodes, denoted by the small circles labeled 1, 2, 3, . . . , 7 in the figure, are deployed. The set of nodes is denoted by P. Each sensor node covers a sensing area denoted by the circles 102. The sensing areas 102 may by any shape and may depend upon the strength of the quantity being sensed. The figure shows the physical extent, 104, of an event, e say, at a particular time t. The locations of the sensor nodes and the extent of the event e may vary with time. The cross-hatched area in FIG. 1 indicates the part of the event that is covered by the sensors at time t. One objective of the present invention is to position the sensor nodes P so as to maximize the coverage of the event. This maximizes the quality of the sampling of the event.

One aspect of the present invention is the use of a utility function, U, to evaluate the sampling quality of events. The utility is a concave function of the data samples gathered for an event. In one embodiment, the data samples are counted as the integration (continuous or discrete) of the covered event area over the lifetime of the event. The utility reflects the information entropy of the data samples, in that it increases with number of data samples in either linearly (as in the case where all data samples are independent over space and time), or sub-linearly (due to inherent data redundancy and correlation among data samples). In other words, the marginal gain in utility always decreases, or stays constant, with number of data samples.

In one embodiment, the utility function is also dependent upon the importance level (or priority level) of events. This may be determined by the event type, severity, location, and/or time frame. As long as importance level and the data correlation can be determined, or estimated, based on data samples gathered so far, the utility function of an event can be determined in a real-time fashion, which is adaptable to spatiotemporal dynamics of the events.

An example utility function U for an event e with importance level p that begins at time 0 and has duration d, is $$U(P)=pf(I), \quad (1)$$

where f is a concave function and $$I=\int_0^d C(t)dt. \quad (2)$$

In equation (2), the event coverage C(t) is the total coverage provided by the sensors that detect the event.

Figure 2:
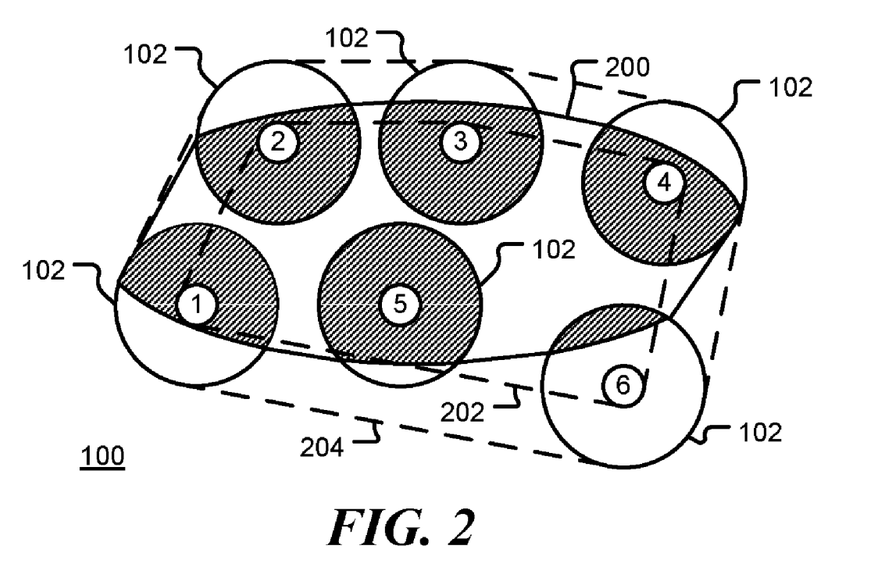
FIG. 2 is a diagram of an exemplary sensor network, showing convex hulls of a community of sensor nodes in accordance with some embodiments of the present invention.

In one embodiment, the total area, a, of the event may be estimated as the area of the convex hull of the sensor nodes that detect the event. Examples of convex hulls are shown in FIG. 2. In this example, sensor nodes 1-6 detect the event. Referring to FIG. 2, the example convex hulls 200, 202 and 204 may be used for different sensor types. Convex hull 200 may be used if the sensor can identify the position of the event. Convex hull 202 may be used if the distance from the sensor to the event is unknown. Convex hull 204 may be used if the distance from the sensor to the event is known, but the direction is unknown. The maximum value of the utility function is $U_{max}=p \cdot f(ad)$.

A further example utility function U for an event e with a time-varying importance level p(t) and duration d, is $$U(P)=f(I) \quad (3)$$

where f is a concave function and $$I=\int_0^d p(t)C(t)dt \quad (4)$$

In this example, the estimated coverage C(t) is weighted by the importance level p(t).

A further aspect of the present invention is the use of a mobility scheduling mechanism that utilizes the importance level and utility function of events. It will be apparent to those of ordinary skill in the art that a variety of importance levels and utility functions may be used without departing from the invention. Indeed, the importance level and utility function of an event of an event may be selected for a specific application.

Figure 3:
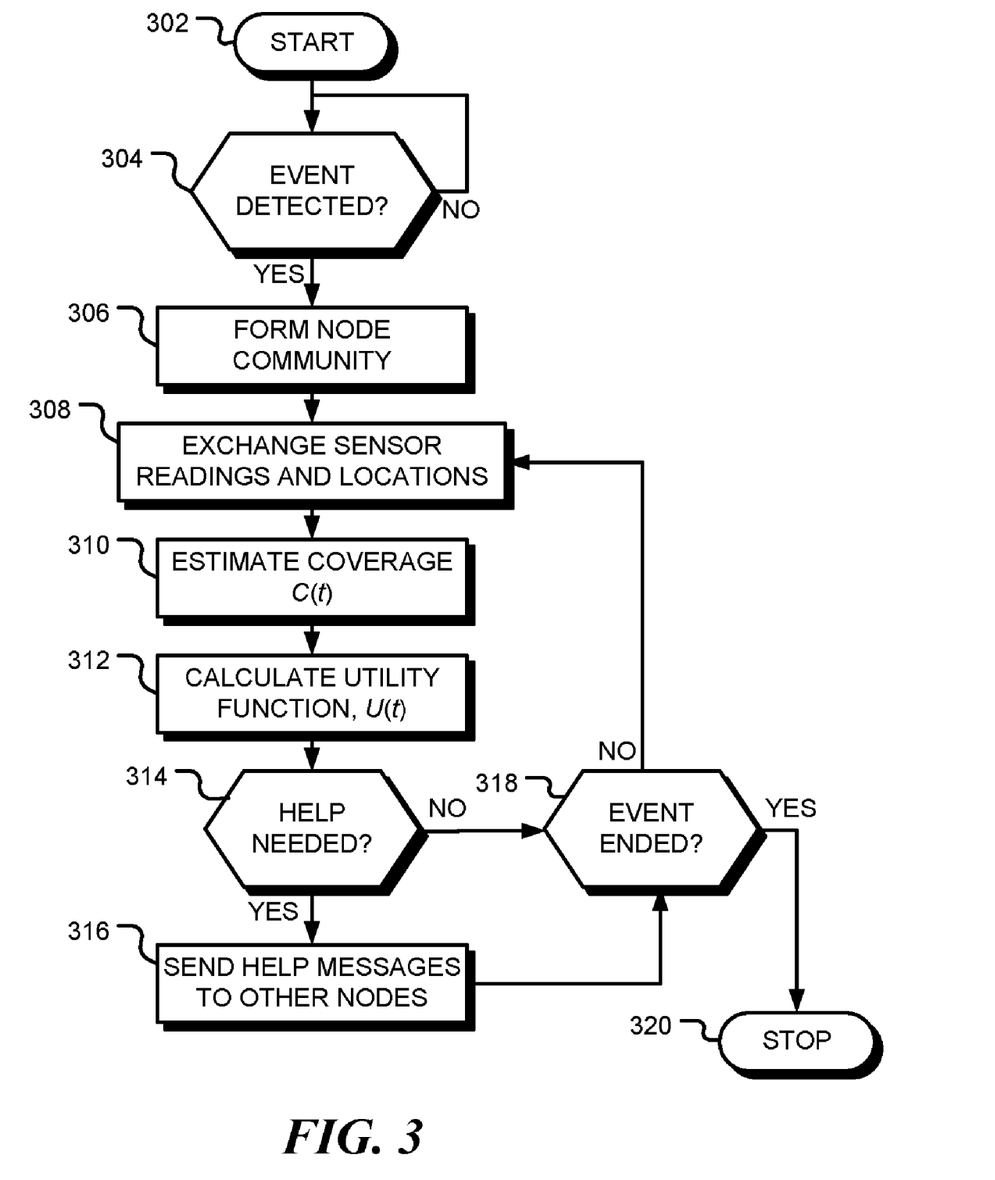
FIG. 3 is a flow chart of a method of resource assignment in a sensor network in accordance with some embodiments of the present invention.

FIG. 3 is first flow chart of a method for mobility scheduling in accordance with certain embodiments of the invention. The method is performed by sensor nodes in a network. Following start block 302 in FIG. 3, the node determines at decision block 304 if an event is detected. If an event is detected, as depicted by the positive branch from decision block 304, the node forms a community at block 306 with other nodes that detect the event. A community is a collection of nodes that are connected through reliable wireless communication to form an ad-hoc network. The network may have a star-structure or a cluster-structure, for example. At block 308, the nodes in the community exchange sensor readings to enable calculation of the utility function of the event (this may either be performed at an elected leader node or in a more distributed fashion). The nodes also exchange location information to enable estimation of the event area using the convex hull of the community. The nodes in the community may try to explore the event as much as they can by moving apart within the event, but without breaking the wireless communication links between them. This increases the accuracy of the estimate of the event area. At block 310, the event coverage C(t) provided by the nodes in the community is estimated. The event coverage and the event importance level are used at block 312 to calculate the utility function U(t). At decision block 314, the community determines if its existing members are able to fully cover the event or if help is needed. This may be done, for example, by comparing the current value of the utility function to the maximum value estimated using the area of the convex hull of the community. If help is needed, as depicted by the positive branch from decision block 314, the node (and/or other nodes in the community) sends out a help message to the rest of the sensor network at block 316. The help message packet contains the location, area, detected time, utility function of the event and the current number of members in the community. The message is propagated into the network, using multi-hop relay for example. At decision block 318, a check is made to determine if the event has ended. If so, as depicted by the positive branch from decision block 318, the process terminates at block 320. If the event has not ended, flow continues to block 308, and the nodes in the community continue to exchange information.

Figure 4:
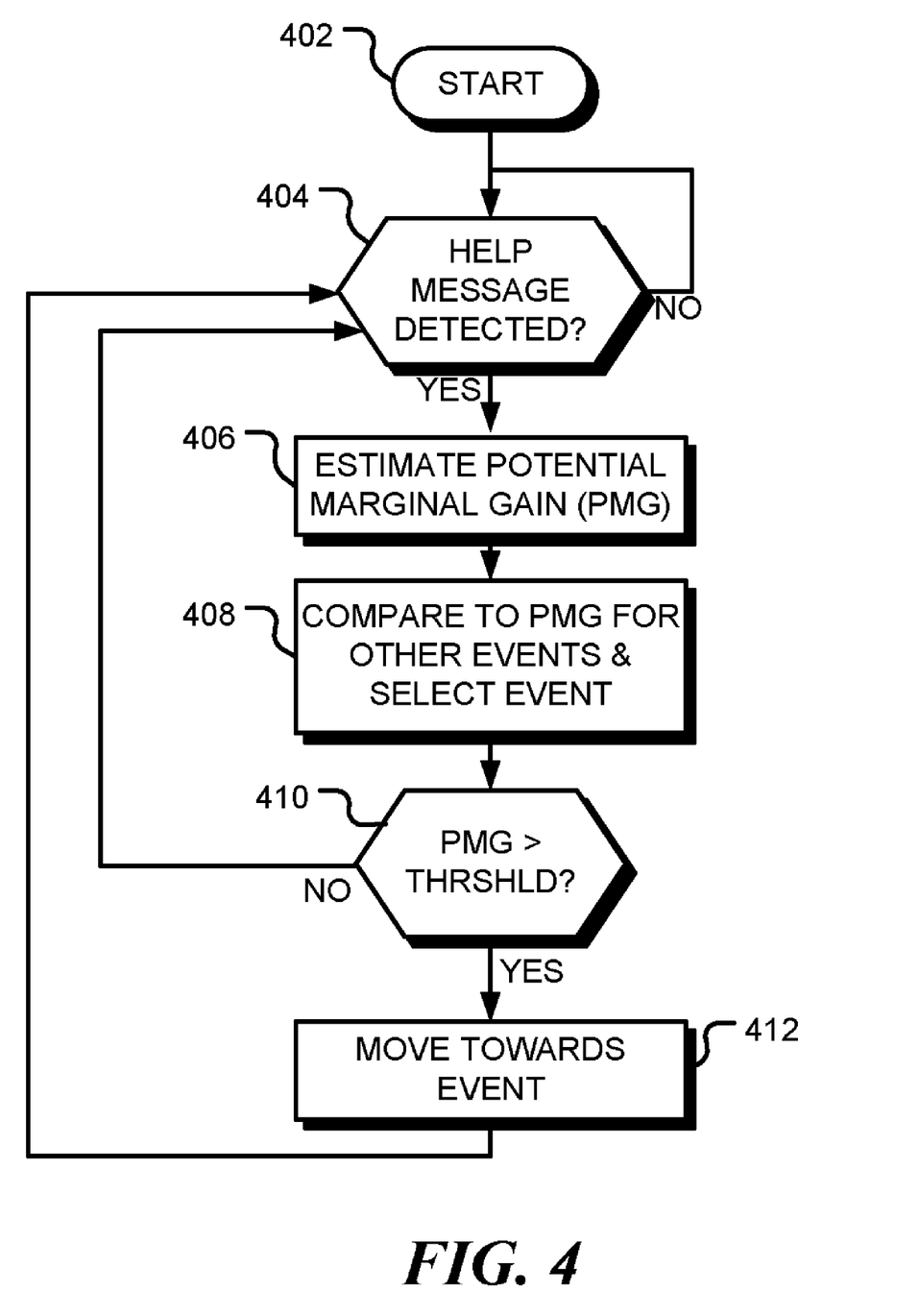
FIG. 4 is a further flow chart of a method of resource assignment in a sensor network in accordance with some embodiments of the present invention.

FIG. 4 is a flow chart of a method performed by a node outside of the community when a help message is received from a community. Following start block 402 in FIG. 4, a node determines, at decision block 404, if a help message has been received. If a message has been received, as depicted by the positive branch from decision block 404, the node estimates the potential marginal gain (PMG) in the sampling utility that can be achieved if the node moves to cover the event. Since the utility function is concave, the potential marginal gain is estimated while taking several factors into consideration: (a) the node movement requires time, which may reduce the utility gain due to accumulated data samples in the community, and (b) other nodes may also move to cover the event, which potentially decreases the utility gain as well. Intuitively, the node is more inclined to move to cover the event if (a) it is close to the event, or (b) the node density around the event is low. Both cases imply a high potential marginal gain for the node.

When a node receives more than one help message from multiple events, it estimates, at block 408, the potential marginal gain for all events and chooses one target event using, for example, a probabilistic method. In addition, a node may also setup a threshold of a minimal marginal gain, or maximal energy costs for scheduling a movement the node. In the example method shown in FIG. 4, the node compares the potential marginal gain to a threshold at decision block 410. If the PMG is greater than the threshold, as depicted by the positive branch from decision block 410, the node moves towards the event at block 412. Flow then returns to decision block 404 since, during its movement, a node may receive updated help messages from events. The node then needs to re-evaluate the marginal gain and re-determine its moving direction, if the changes in marginal gain exceed certain threshold. If the PMG is not greater than the threshold, as depicted by the negative branch from decision block 410, flow again returns to decision block 404 to await new help messages.

The Utility-Driven Mobility (UDM) scheme described above is based on the concept of community, with each community consisting of a set of nodes. An event may be covered by multiple communities, with each community behaving as a basic operational unit. This is particularly useful for coping with realistic events that exhibit spatial dynamics. An example of such an event is the pollution of a body of water with different toxin concentration over space, and consequently various importance level. With a node community, high resolution of the events is enabled, which optimizes the system utility. The majority of information exchanged is constrained to be within each individual community, thus increasing the scalability of the scheme.

Figure 5:
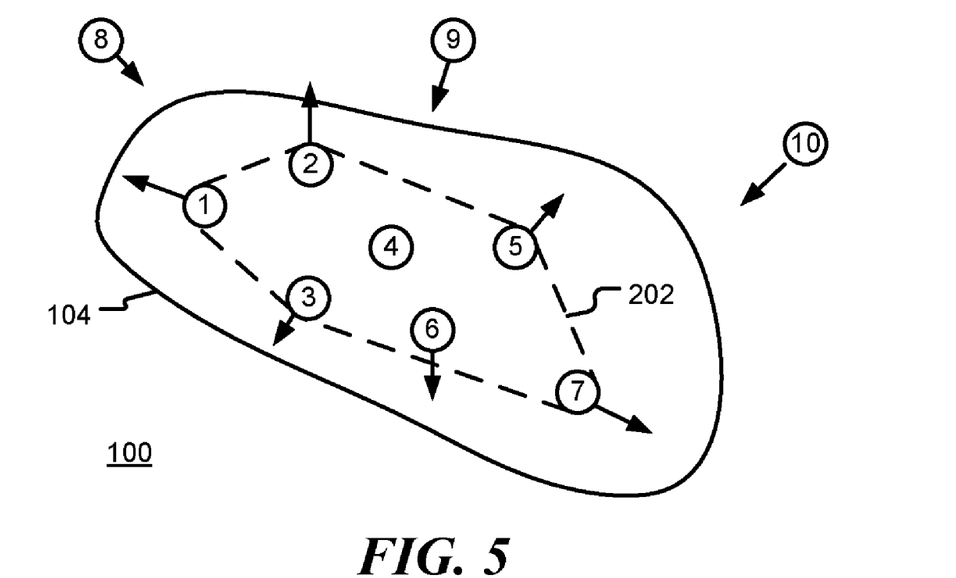
FIGS. 5-7 are diagrams illustrative of resource assignment in a sensor network in accordance with some embodiments of the present invention.
Figure 6:
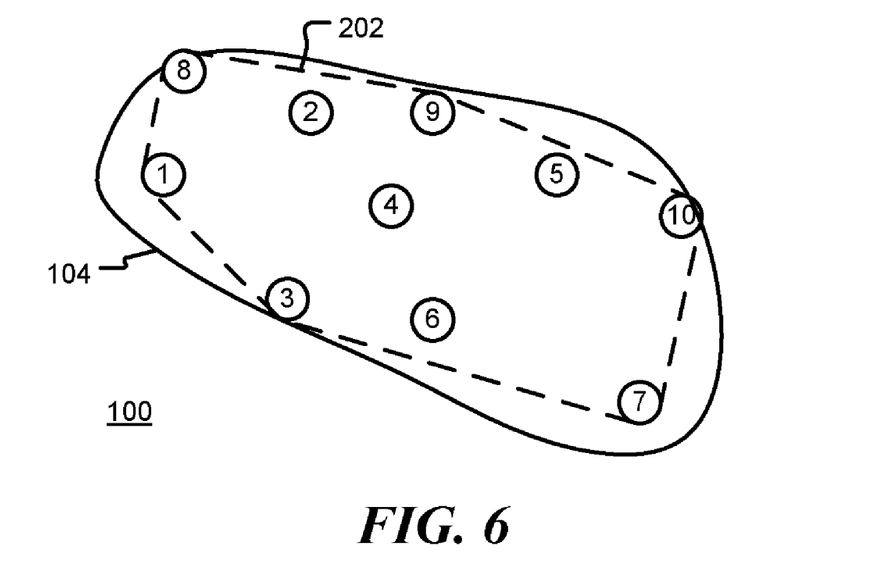

The UDM scheme comprises two fundamental operations: a discovery operation and a recruit operation. These operations are illustrated in FIG. 5 and FIG. 6. The discovery operation begins when an event is first discovered by a node or a group of nodes (possibly in multiple connected sets). Referring to FIG. 5, nodes 1-7 are within the area 104 of an event. These nodes communicate with one another and form a community. If only one node is in the area of an event, it is possible to form an initial community containing only one node. The nodes then start moving themselves apart as much as possible, as indicated by the arrows in FIG. 5. The nodes are constrained by the boundary of the event and their neighboring relationship. When a node reaches a stable location, it remains static.

Nodes within each community continuously or periodically exchange their location and sensor readings. The sensor readings are used to derive the utility function of the event; while the location is used to estimate the event area. Both parameters are based on local knowledge of the community and reflect the status of the event with respect to the community only. The term 'community event', or simply 'c-event' is used to refer to the portion of the event that is covered by a community. If a community finds itself incapable of fully covering its c-event, it starts the recruit operation by periodically broadcasting help message to its neighbors. A help message contains key information about the c-event and the community. In FIG. 5, help messages are received by nodes 8, 9 and 10, outside of the community. The help messages are also relayed by nodes to reach a larger population. Upon receiving a help message, a node autonomously decides whether to move and cover the corresponding c-event. The intuition is to maximize the potential marginal gain (PMG) in sampling utility by the time the node moves to the c-event.

The PMG is estimated based on various factors, including the distance to the c-event and estimated node density around the c-event. A node may receive help messages from multiple c-events. Weighted by the PMG of all these events, the node uses a probabilistic model to choose a c-event to cover. In FIG. 5, nodes 8, 9 and 10 determine that the PMG is high enough and start moving towards the c-event area 104.

After a node reaches the c-event, it joins the corresponding community and chooses a location that maximizes the coverage of the c-event. The community state is updated accordingly and reflected in future help messages.

In the discovery operation, nodes that detect an event periodically broadcast their location and sensor readings to neighbors. By exchanging sensor readings, each node has a list of neighbors that have detected the same event. These nodes then start to disperse themselves as far apart as possible, constrained by the boundary of the event area and their neighborhood relationship. Each pair of neighbors may be constrained to be always within a pre-determined maximal distance, R. This dispersal operation resembles virtual force-based algorithms, with a virtual expelling force between every pair of neighbors. In one embodiment, based on the location information, every node calculates the virtual expelling force from its neighbors as R minus the current distance.

Constrained by the event boundary, the composition (i.e., a vector summation) of these forces determines the next movement of the node. To practically terminate the algorithm, when a node reaches a stable position for a pre-determined time period, it remains static from then on. At the same time, nodes start forming communities. In one embodiment, a community is determined as a set of nodes with a diameter of at most two hops. To form communities, every node broadcasts a randomly chosen number to its neighbors and waits for a time duration that is proportional to the random number. Upon expiration of the time duration, the node with the smallest number becomes a leader, with the corresponding community consisting of all its neighbors. The community members also notify their neighbors that they have joined a community, thus quitting the competition. Various leader election algorithms known in the art are well suited for this purpose.

Leaders of each community are then responsible for collecting sensor readings and location information from the community members. The sensor readings are used to assess the type and severity of the c-event, and the data correlation among multiple nodes, thus deriving the importance level and the utility function. All sensor readings are tagged with time and location information, so that the correlation coefficient over distance can be calculated and curve fitted to a particular model. The location information is used to estimate the area of the c-event based on the convex hull of all community members. In FIG. 5, the convex hull of the community is denoted by 202.

The discovery operation uses localized information exchange between neighbors. Also, once a community is formed, its leader can be periodically rotated among community members to avoid overloading a particular node. For instance, leader can be rotated based on the power supply of community members.

It is possible for an event with a large area to be discovered simultaneously by multiple sets of connected nodes that are disconnected across sets. In this case, the discovery operation is self-contained in each set.

In the recruit operation, help messages are generated by leaders of communities that require extra nodes to cover the c-events. The help messages are propagated into the network, attracting nodes in vicinity to move toward the c-events. This can be thought of as a virtual pulling force toward each c-event. The main intuition behind this operation is to maximize the PMG of the sampling utility of a target c-event.

Consider a c-event e. The help messages for a c-event e, are generated by the corresponding community, P, consists of a tuple <p, f( ), z, l, a, $t^d$, $t^s$, I($t^s$)>, where $t^d$ is the time when the event is first discovered, $t^s$ is the time when the help message is sent out from the community P, z denotes the size of the area covered by a node (the radius for example), I($t^s$) signifies the amount of data samples gathered until time $t^s$, i.e., $I(t_s)=\int_{t^d}^{t^s} C(t)dt$.

The sampling frequency is ignored here, as it is assumed to be the same for all events. As before, p is the importance level, f is a concave function, l and a are the location and area of the event, respectively.

The help messages are then broadcast to neighbors of the community, and are further relayed to reach a larger node population. When receiving a help message, a node estimates the PMG if it moves to cover the corresponding c-event.

The node must estimate the PMG that will be achieved when the node reaches the event. If $T_1$ denotes the time taken for the help message to arrive and $T_2$ denotes the time taken for the node to travel to the event, the node will arrive at the event at a time $T=T_1+T_2$, after the help message was sent. Thus, the PMG must be predicted a time T into the future. If T is large, the projected PMG is reduced, since it may be assumed that closer nodes will have moved to cover the event before the node receiving the help message can arrive at the event.

The UDM scheme described above differs from traditional virtual force-based algorithms in several key aspects. Firstly, the virtual force in UDM stems from the potential utility gain of monitoring an event that can be far away, whereas in previous schemes virtual forces are generated by nearby nodes or obstacles. Secondly, the UDM scheme always chooses the c-event with the most significant virtual force to cover, whereas in previous schemes node mobility follows the composition of all virtual force exerted on the nodes.

When a node travels toward a target c-event, it may receive updated help messages from the target c-event, or other c-events. In such a case, the node needs to re-evaluate the PMG based on the newly received help messages and adapt its mobility accordingly. To avoid system thrash, motion adaptation is only triggered when the variations in PMG exceeds certain pre-defined threshold (e.g., the target event becomes fully covered). The same method holds for existing members of communities when they receive help messages from other communities. When nodes decide to leave the current community, they need to inform the community leader. Moreover, when the leader decides to leave, it needs to designate the leadership to another member before leaving.

It is also possible that the node may encounter a new event (or a partial event area that is not covered so far) on its way (the node can determine this case if the event is not on the list of c-events it has received from recruit messages). In these cases, the node starts a new discovery operation with its neighbors.

After a node finally reaches a target c-event, it joins the corresponding community by broadcasting a hello message to the community. Referring now to FIG. 6, nodes 8, 9 and 10 have reached the target c-event 104. Coordinating with the community leader, the node then moves to a location to improve the coverage of the c-event. Existing community members may also adjust their positions for a better coverage of the c-event, subject to the convex hull of the community. The desired location of the node and other community members can be determined by techniques known to those of ordinary skill in the art.

To avoid overwhelming communication cost due to the broadcast storm problem, various controlled flooding techniques are applicable to propagate help messages. Moreover, time-to-live (TTL) in terms of hop count is set for all help messages to prevent them flooding the entire network.

In FIG. 6, nodes 1-7 have been dispersed within the event area 104 and nodes 8-10 have recently entered the event area. The area of the convex hull 202 has increased, which indicates that more of the event area 104 is covered by the sensors.

Figure 7:
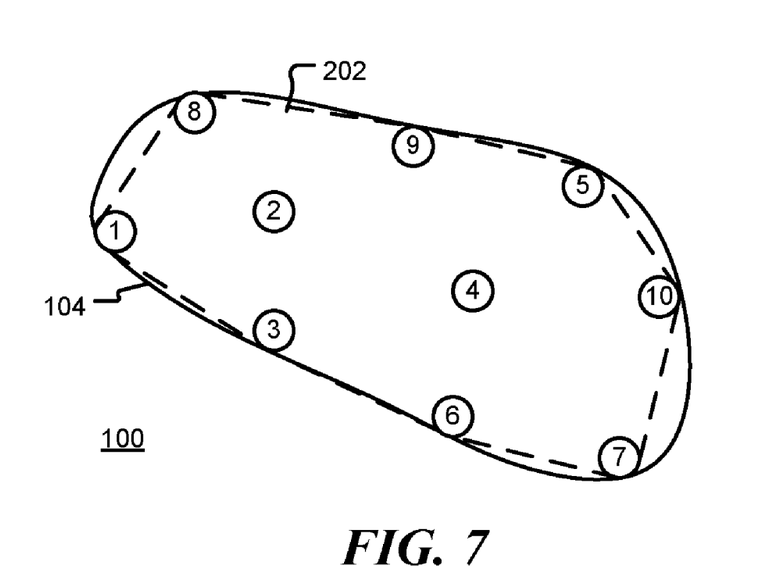

Eventually, a static state may be reached, as shown for example in FIG. 7. In FIG. 7, the nodes 1-10 are maximally dispersed within the event area 104, and the convex hull 202 covers a large proportion of the event area 104. The coverage of the event area 104 is significantly greater than the initial coverage shown in FIG. 5.

Figure 8:
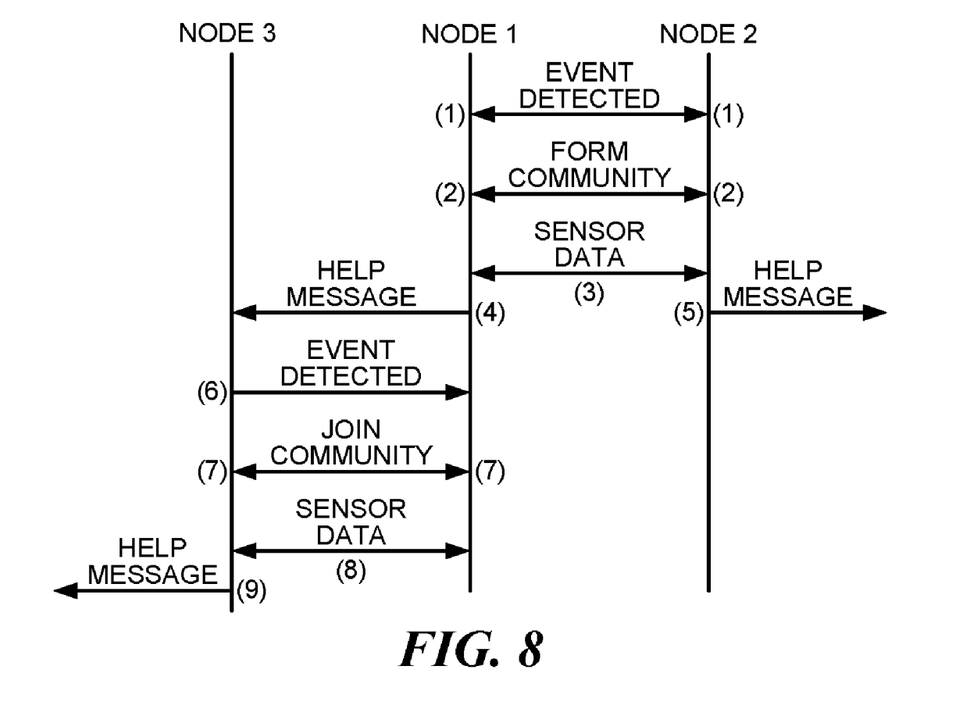
FIG. 8 is a simplified sequence diagram of a method for resource assignment in a sensor network, in accordance with certain embodiments of the present invention. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 8 is a simplified sequence diagram of a method for resource assignment in a sensor network, in accordance with certain embodiments of the present invention. At time (1) in FIG. 8, node 1 and node 2, which are located within the area of an event, detect the event and exchange messages with their neighboring nodes. At time (2), nodes 1 and 2, having determined that they have detected the same event, exchange messages to form a community. In this example, node 1 is elected as leader of the community. At time (3) nodes 1 and 2 (and any other nodes in the community) exchange sensor data and location data. This data is used to estimate the extent of the event (using the convex hull of the community for example) and the current utility. At time (4), node 1 sends out a help message. At time (5), node 2 sends out a help message—this may be in response to a help message received from the leader node, node 1. These help messages contain key information concerning the event and the community. The message from node 1 is received by node 3, which is outside of the community at this time. Node 3 estimates the potential marginal gain (PMG) that would be achieved if node 3 were to move to cover the event. If the PMG is high enough, node 3 moves towards the event. At time (6), node 3, having moved into the event area, detects the event and signals node 1. At time (7) nodes 1 and 3 exchange messages to enable node 3 to join the community. At time (8), node 1 and node 3 exchange sensor data, since node 3 is now part of the community. At time (9), node 3 may send out a help message if it is determined that the coverage of the event is still not covered sufficiently. This process continues until sufficient coverage is reached or the event ends.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for resource assignment in a network of sensor nodes, the method comprising:
    a first sensor node of the network detecting an event and collecting data samples for the event;
    the first sensor node exchanging messages with other sensor nodes of the network that detect the event to form a community of sensor nodes;
    sensor nodes in the community exchanging information comprising sensor data and location information;
    one or more sensor nodes of the community computing the total data samples collected for the event by the community wherein the total data samples collected by the community is calculated as a time integral of the event coverage provided by the community;
    the first sensor node of the community sending a help message to a second sensor node outside of the community;
    the second sensor node estimating a potential marginal gain to be attained if the second sensor node were to be assigned to cover the event; and
    the second sensor node covering the event if the potential marginal gain exceeds a threshold, wherein the potential marginal gain comprises the expected change in a utility function that is dependent upon the total data samples collected for the event by the community;
    wherein the utility function comprises a concave function of the total data samples collected for the event by the community.

2. A method in accordance with claim 1, wherein the utility function is dependent upon an importance level of the event.

3. A method in accordance with claim 1, wherein the potential margin gain is calculated dependent upon the estimated time from when the help message was sent to when the second sensor node will detect the event.

4. A method in accordance with claim 1, wherein the second sensor node is a mobile sensor node and wherein the second sensor mode covering the event comprises the second sensor node moving towards the event.

5. A method in accordance with claim 1, wherein the second sensor node covering the event comprises:
    the second sensor node activating previously deactivated functions.

6. A method in accordance with claim 1, wherein the second sensor node covering the event comprises:
    the second sensor node receiving code from a remote source; and
    the second sensor node executing the code.

7. A method in accordance with claim 1, wherein the network comprises mobile sensor nodes, the method further comprising the sensor nodes in the community moving away from each within the area of the event.

8. A method in accordance with claim 1, further comprising the second sensor node joining the community once it detects the event.

9. A method in accordance with claim 1, further comprising one or more sensor nodes of the community computing an estimate of the area of the event from the convex hull of sensor nodes in the community.

10. A method in accordance with claim 1, wherein the help message comprises:
    a measure of the data samples collected by the community before the help message was sent; and
    the location of the event.

11. A method in accordance with claim 10, wherein the help message further comprises the importance level of the event.

12. A method in accordance with claim 10, wherein the help message further comprises the time the event was first detected.

13. A method in accordance with claim 10, wherein the help message further comprises:
    the estimated area of the event;
    the area covered by a sensor node in the community; and
    a concave function to be used to calculate the utility function.

14. A network of sensor nodes for collecting data samples of an event, the network comprising:
    a first set of sensor nodes operable to detect the event, collect data samples for the event, and exchange messages to form a community of sensor nodes when the event is detected;
    a second set of at least one sensor node, contained within the first set of sensor nodes, operable to compute the total data samples collected for the event by the community; and
    an external sensor node, not within the community of sensor nodes, operable to receive a help message from a sensor node of the community and further operable to cover the event if an estimate of a potential marginal gain exceeds a threshold,
the potential marginal gain comprising the expected change in a utility function that is dependent upon the total data samples collected for the event by the community, wherein the utility function comprises a concave function of the total data samples collected for the event by the community.

15. A network of sensor nodes in accordance with claim 14, wherein the sensor nodes comprise mobile sensor nodes and wherein the first set of sensor nodes are further operable to move away from each other within the area of the event.

16. A network of sensor nodes in accordance with claim 14, wherein the external sensor node comprise a mobile sensor nodes and wherein the external sensor node is operable to move towards the location of the event if the estimate of a potential marginal gain exceeds a threshold.

17. A network of sensor nodes in accordance with claim 14, wherein the help message is transmitted over a wireless communication link.

18. A network of sensor nodes in accordance with claim 14, wherein the external sensor node comprise a static sensor node and wherein the external sensor node is operable to activate previously deactivated functions if the sensor node is within the area of the event and the estimate of a potential marginal gain exceeds a threshold.

* * * * *

UNITED STATES PATENT AND TRADEMARK OFFICE
CERTIFICATE OF CORRECTION

| | | |
|---|---|---|
| PATENT NO. | : 8,131,839 B2 | Page 1 of 1 |
| APPLICATION NO. | : 11/832259 | |
| DATED | : March 6, 2012 | |
| INVENTOR(S) | : Yu et al. | |

It is certified that error appears in the above-identified patent and that said Letters Patent is hereby corrected as shown below:

On Page 2, Item (56), under "OTHER PUBLICATION", in Column 2, Line 20, delete "Sytems" and insert -- Systems --, therefor.

In Fig. 4, Sheet 3 of 5, for Tag "410", in Line 2, delete "THRSHLD ?" and insert -- THRESHOLD ? --, therefor.

In Column 5, Line 30, delete "mode" and insert -- node --, therefor.

In Column 12, Line 17, in Claim 4, delete "mode" and insert -- node --, therefor.

Signed and Sealed this
Eighteenth Day of December, 2012

David J. Kappos
*Director of the United States Patent and Trademark Office*